Oct. 12, 1965  E. LINSINGER  3,211,059
APPARATUS FOR MILLING WITH CARBIDE-TIPPED MILLING CUTTERS
Filed Aug. 31, 1960  10 Sheets-Sheet 1

Inventor
Ernst Linsinger
by
Roberts, Cushman & Grover,
Attorneys.

Oct. 12, 1965     E. LINSINGER     3,211,059
APPARATUS FOR MILLING WITH CARBIDE-TIPPED MILLING CUTTERS
Filed Aug. 31, 1960     10 Sheets-Sheet 2

Inventor
Ernst Linsinger,
by
Roberts, Cushman & Grover,
Attorneys.

United States Patent Office 3,211,059
Patented Oct. 12, 1965

3,211,059
APPARATUS FOR MILLING WITH CARBIDE-TIPPED MILLING CUTTERS
Ernst Linsinger, Steyrermuhl, Austria
Filed Aug. 31, 1960, Ser. No. 53,092
Claims priority, application Austria, Sept. 9, 1959, Ser. No. A 6,553/59; 1st addition to Ser. No. A 6,553/59, Dec. 7, 1959, Ser. No. A 8,841; 2nd addition to Ser. No. A 6,553/59, June 14, 1960, Ser. No. A 4,525
7 Claims. (Cl. 90—11)

The present invention is generally concerned with the problem of milling with a high fed rate of more than 500 mm./min. and particularly with the problem of improving the cut-off milling to form a profiled cut in such a manner that satisfactory parting faces are obtained with economical feed rates.

Carbide-tipped tools have been used for three decades with great success in the machining of metals, mainly in continuous cutting operations, such as turning. It is surprising that cemented carbides have not been applied on the same scale to intermittent cutting operations, such as milling. This is due to the fact that milling machines of conventional type cannot operate with carbide-tipped tools without difficulty. They do not have the necessary rigidity to resist vibration and tend to chatter, which results in a premature blunting of the finely machined cemented carbide tips. Besides, a poor surface finish is obtained. As these sources of failure are not properly recognized, it is attempted in most cases to reduce the feed rate. Whereas the cut will then become steadier, the cemented carbide tips will hardly be more durable because the thickness of cut is reduced below the limit which is permissible with carbide tips. Cemented carbide tips tend to crush if the thickness of cut is too small. This results in increased friction and rapid wear and can again cause chattering. If it is attempted to eliminate chattering by a reduction of the depth of cut, it is finally seen that carbide-tipped tools do not have special advantages compared to tools of high-speed steel. The upper limit for the previously achieved feed rate may be considered to be about 500 mm./min.

The invention teaches how the great advantages of cemented carbides can be utilized in milling and the feed rates can be increased to a previously unknown magnitude. The invention is based on the following considerations which have proved to be correct in thorough tests.

Reference will be made first to the drive means of the milling machine. It is known that the backlash in the drive may result in detrimental vibration, particularly in climb milling, in which the tool tends to lead and drive the workpiece, in which case the backlash in the drive becomes effective. It is an object of the invention to reduce this backlash or to render it ineffective. To this end the torque from the drive motor may be transmitted to the cutter spindle by vibration-damping drive elements which are free of backlash or at least capable to compensate backlash. These drive elements may comprise non-metallic belts, metal chains or resiliently mounted gearwheels, with or without friction elements. All these are resilient and have a hysteresis-like spring characteristic, which dissipates vibration energy. A third element which may be used is a worm gear drive which can be adjusted to eliminate backlash and which has also a damping action owing to the inherently unfavorable friction conditions. A milling machine provided with these means is suitable not only for conventional but also for climb milling without chattering.

Whereas these characteristic features enable the milling machine to perform a steady cut and impose only low impact stresses on the cutting edges, the following features of the tools serve to achieve large feed rates.

The feed rate may be represented by the formula $$\frac{1000V}{a} \times s_v \text{ or } \frac{1000V}{a} \times k \times s$$

wherein $V$ = cutting speed in meters/min.
$a$ = cutting edge spacing in mm.
$s_v$ = feed per cut in mm.
$s$ = thickness of cut in mm.

$$k = \frac{s_v}{s}$$

The factor $k$ will be referred to hereinafter as "comma factor."

The following relation has been found:

$$s_v = \sqrt{D_F - t}(\sqrt{t} - \sqrt{t-s})$$

wherein $D_F$ is the tip circle diameter of the inserted tooth cutter and $t$ is the depth of the cut. The formula is correct to a close approximation when $t \ll D_F$. For this reason the comma factor will be the larger the larger is the tip circle diameter and the smaller is the depth of cut.

According to the feed rate formula developed hereinbefore, the feed rate will be the larger the higher is the cutting speed, the larger will be the comma factor and the smaller will be the cutting edge spacing.

The present milling method is based on the use of cemented carbide tips. They will inherently withstand much higher cutting speeds than high-speed steels. Compared to the continuous cut the cutting speed may be further increased in milling operations because the tips are in engagement with the workpiece only during a small part of their movement and can cool down during the much larger movement when they are not cutting. It is in accordance with the invention to use inserted tooth cutters having large diameters. The larger the diameter the larger is the non-cutting movement and the better is the cooling.

The use of inserted tooth cutters having a large diameter is also proposed in accordance with the invention for another reason. Owing to the small absolute limits for the tip load in the case of high-speed steel, hardly any attention has been given before to the relations between the thickness of cut and feed rate. During the research work underlying the present invention, however, it has been recognized that for a given thickness of cut the feed per cut will depend on the depth of cut and on the diameter of the inserted tooth cutter. The comma factor $$k = \frac{s_v}{s}$$

indicates the factor by which the feed rate can be larger than the thickness of cut. This factor will be the larger the larger is the cutter and the smaller the depth of cut. An increase in the thickness of cut will also increase the comma factor. Based on this recognition too it is advantageous to use inserted tooth cutters having a large diameter. A third advantage resides in that the spacing of the cutting edges for any given tooth design will be the smaller the larger is the diameter of the cutter. The larger thickness of cut will also be suitable in view of the nature of the cemented carbide tips. It is finally seen that for a given thickness of cut and constant driving power it may be more favorable to obtain any given depth of cut in two or more passes. If the geometry of the cut is intelligently used, the saving of time will also be larger than the time required for the additional high-speed return movement so that a net saving in time is obtained.

The cutting edge spacing $a$ may be reduced to a small value by an appropriate design. It is particularly suitable to use double-tapered cutters having crossing teeth, which overlap only adjacent to the tips, i.e., to the largest diameter. This enables a very small cutting edge spacing. Such milling cutters have been described in the Austrian patent specification No. 189,881.

In consideration of the recognitions set forth hereinbefore, the present invention may be described as providing apparatus for milling with the aid of carbide-tipped milling cutters, which is characterized in that to obtain an economical feed rate, which exceeds the conventional feed rate, the transmissions for driving the milling cutter are designed to damp vibration, that the spacing of the cutting edges is as small as possible and the diameter of the inserted-tooth milling cutter is so large that the comma factor approaches the economical maximum for a given depth of cut, the thickness of cut is near the upper limit and the feed rate exceeds the thickness of cut by the comma factor so that $$\frac{1000V}{a}s_v > 500 \text{ mm./min.}$$

in which formula $V$ is again the cutting speed in meters/min., $a$ the cutting edge spacing in mm. and $s_v$ the feed per cut in mm.

The cutting edge spacing of the milling cutter can suitably be reduced by using a milling cutter having clamped cemented carbide tips.

Cut-off milling may be referred to as the most important application of the milling method according to the present invention. Cut-off milling is the cutting of plates of considerable thickness so as to obtain parting faces which are suitable for the formation of welded joints. This is a preparatory operation which is carried out before welding in steel construction work. Plates of substantial thickness have previously been cut mainly with the torch, whereafter the parting faces were planed, so that two operations were required, which had to be performed on different machines. Milling was previously out of the question because the working times required with known machines and tools would have been much too long. On the other hand, cut-off milling according to the method of the invention is highly superior to the previous methods because the machine and tools may be designed so that only a single operation is required and can be performed in a much shorter time.

To form the bevels of the opposed parting faces, which bevels have, as a rule, an inclination of 35° and serve to receive the weld beads, the invention is suitably carried out with the aid of a double-tapered inserted-tooth cutter according to the Austrian Patent No. 189,881. Owing to the crossing teeth this cutter enables a particularly small cutting edge spacing, which is one of the most important requirements for milling with a large feed rate. In a development of this proved design, the teeth may be so arranged according to the invention that Y-shaped end faces are directly obtained in one pass, without need for additional teeth, as will be explained hereinafter in deatil with reference to the accompanying drawings, in which practical embodiments of milling apparatus according to the invention will also be explained by way of example.

FIGS. 5 to 9 show an illustrative embodiment of a cut-off milling machine according to the invention for tubes, comprising hydraulic gripping means and gripping belts. More particularly, FIGS. 10 to 13 show by way of example a tube cutting machine for nonrotating tubes, which are moved only in the axial direction. More particularly.

Figure 1:
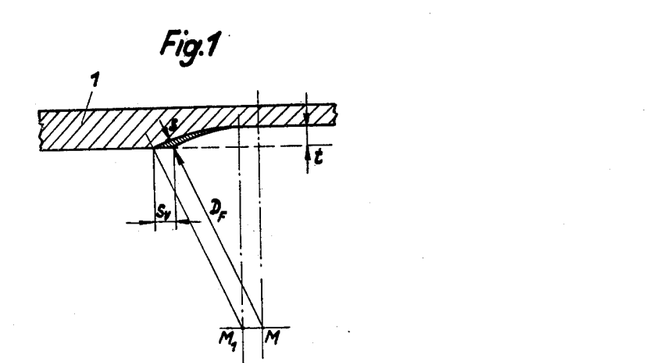
FIGS. 1 and 2 are sketches illustrating the geometrical relations during milling.
Figure 2:
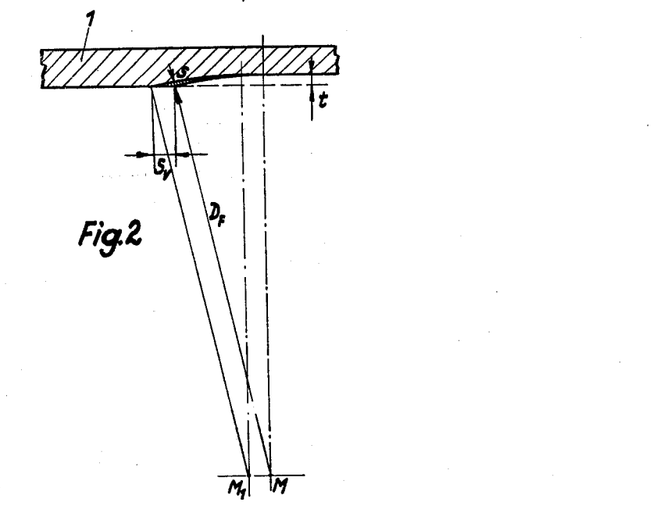

In FIG. 1, 1 is the workpiece, which is to be machined to the depth $t$. During the cut of one tooth the center $M$ of the inserted tooth cutter having the diameter $D_F$ moves by the feed $s_v$ to $M_1$. The end edge cuts a comma-shaped chip having the largest thickness $s$. FIG. 2 shows the conditions obtained in the case of a cut having only a depth $t'$, which is one half of $t$, whereas the diameter $D_F'$ of the inserted tooth cutter is twice $D_F$. It is seen that the chip is elongated. If the same feed $s_v$ is used, the chip will be thinner (thickness $s'$). If a chip having the thickness $s$ was admitted in FIG. 2, the feed could be approximately twice as large. If, for example, the comma factor with $s_v$ and $s$ according to FIG. 1 is 2.26 and according to FIG. 2 with half the depth, it is 4.56, i.e., approximately twice as large.

An example will clearly indicate the considerable progress which is achieved. A V-shaped or trapezoidal groove having a mean width of 10 mm. and a depth of 10 mm. is to be milled into a plate of carbon steel having a strength of 60 kg./sq. mm. According to orthodox recommendations a carbide-tipped inserted-tooth milling cutter having a diameter of 150 mm. and having eight teeth, a cutting rate of 120 metres/min. and a peripheral feed of 0.15 mm. per tooth would be used for this purpose. In this case an optimum feed rate of about 300 mm./min. could be achieved, which lies near the upper limit for known conditions. On the other hand, if the teachings of the invention are followed in that a vibration-free drive system is used as well as a double-tapered inserted tooth cutter having a diameter of 700 mm., with which an effective cutting edge spacing of 30 mm. can easily be obtained, and the cutting speed is increased to 250 meter/min. and the thickness of cut to 0.3 mm., a feed rate of 10,500 mm./min. can be obtained for the same depth of cut. This value is more than three times the feed rate which can be achieved with orthodox methods using milling cutters of high-speed steel. It is obvious that such high feed rates require correspondingly high drive powers. Whereas a drive power of about 2.0 kw. is sufficient when working according to the orthodox method, the power input in the case of a feed rate of 10,500 mm./min. rises to about 60 kw. However, a drive system according to the invention will readily enable the construction of milling machines in which such high powers can actually be used.

Figure 3:
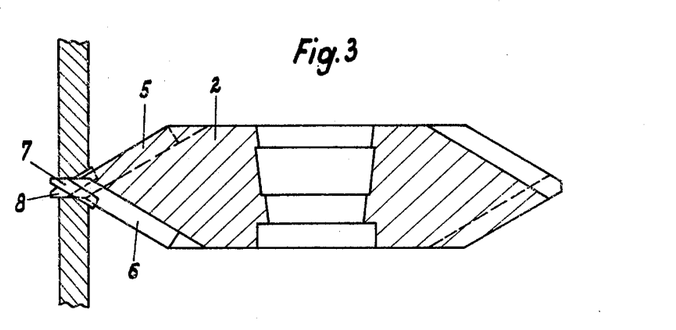
FIGS. 3 and 4 show a milling cutter having clamped cemented carbide tips, which is shown in FIG. 3 in an elevation and partly in sectional view taken on line III—III of FIG. 4, which is a top plan view of the cutter of FIG. 3.
Figure 4:
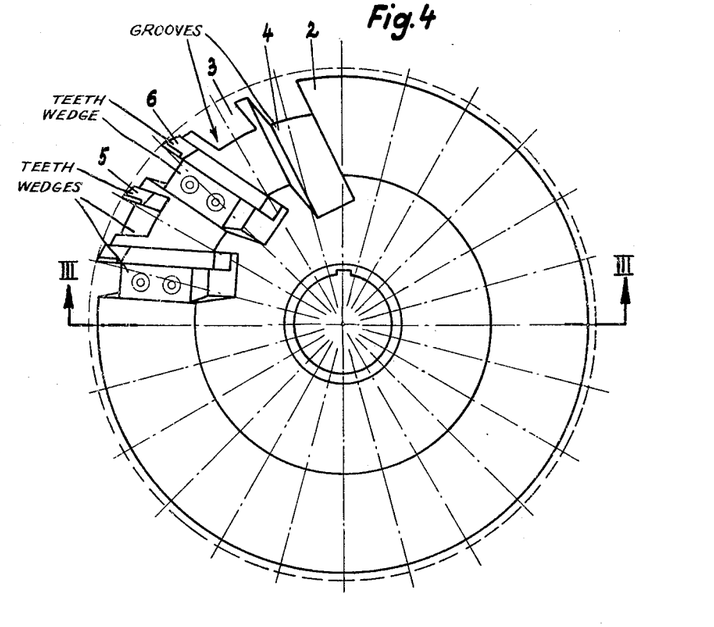

In FIGS. 3 and 4, 2 is the body of an inserted-tooth cutter, which is defined on both sides according to coaxial frustums of cones. The grooves 3 and 4 for receiving the teeth have a bottom lying on a cone and are staggered from left to right. As a result, the teeth 5 and 6 inserted in these grooves cross each other. Their effective side edges 7 and 8 extend in the direction of the generatrix of the cone whereas they have approximately radial boundaries at their back. The pairs of crossing teeth extend sufficiently forwardly in their grooves to cause the back of one tooth to extend beyond the side edge of the associated tooth. This results in a serrated cutting edge line. Using the arrangement shown in the drawing, a Y-bevel may be obtained, e.g., and the spacing of the two normal end faces can be varied within the limits determined by the design of the inserted-tooth milling cutter. Thus, the arrangement is such that each tooth cutting on both sides cuts with one side one part of one side of the profile to be milled and with the other side cuts a part, which does not correspond to the first-mentioned part, of the opposite side of this profile, which two parts are supplemented by the surfaces cut by a subsequent tooth, which crosses the tooth considered first, to form the complete profile.

The practical application of the present method will now be explained with reference to some illustrative embodiments. The following remarks may be made beforehand:

It is known to form tubes by winding endless strip in helical form and welding the abutting side faces together. This method results in an endless tube, which rotates about its longitudinal axis and from which the desired lengths of tube must be cut off. At the present time this can be performed only by torch cutting. The operator applies the torch to a point of the periphery and retains it there. The cut will proceed at the rate at which the tube is rotated. The operator must follow the feed movement of the tube and cannot return to its initial position until the tube has been completely cut off. The end faces of the tubes must subsequently be machined on a special lathe.

The present machine, which is shown in FIGS. 5 to 9, operates substantially as follows:

A cut-off milling unit consisting of a milling cutter having the properties set forth hereinbefore and a setting and driving unit is mounted on a milling carriage which can be coupled to the tube by appropriate means to be described below with reference to FIGS. 10 and 11. The tube will then carry the milling carriage along until the cut has been completed. The connection between the tube and the carriage is then interrupted and the carriage can be returned to its initial position by a propulsion drive.

The cut is completed approximately with one revolution of the tube. Thus, the feed of the milling operation is determined by the peripheral speed of the tube in a normal plane. The presently available tube winding machines have peripheral feed rates of about 500–2500 mm./min. A machining method enabling a clean parting cut-off and, if desired, simultaneous bevelling at this peripheral feed rate has not been available so far.

The cut-off unit mounted on the cut-off carriage must perform two functions: In the first place it must operatively couple the carriage to the tube from time to time and must grip the tube at the same time so as to ensure a steady cut. In the second place it must move the milling unit to the tube and hold it in cutting position for the duration of the cut. It may also be necessary to set the milling unit so that it does not engage a stop but can oscillate within certain limits. This will always be necessary when the tube is not exactly circular whereas the bevel should have the same width with respect to the outside or inside surface of the tube.

The first object requires that a longitudinally movable machine part must be connected under remote control to a rotating body. In addition, the requirement for a steady cut and clean, uniform end faces involves the gripping of the tube on both sides of the cutting station by gripping heads. According to the invention the gripping is effected by a prime mover, such as a compressed-air piston, a hydraulic piston or a magnetic armature, by means of an epicyclic gear. Each gripping head has rotatably mounted therein two gripping rings, on which gripping jaws are pivotally mounted. A relative rotation of the gripping rings will cause the gripping jaws to be applied to the tube under a selectable pressure. The details of this construction will be described hereinbelow with reference to FIGS. 7, 8 and 11. The two gripping rings are driven in opposite directions at equal speed by coaxial drive wheels of an epicyclic gear. On one side an idler wheel is inserted so that the gripping rings rotate in mutually opposite directions when the coaxial drive wheels move in the same sense. The two coaxial drive wheels of the epicyclic gear are connected by a planet wheel, the bearing housing of which (planet housing) is also capable of a coaxial rotation. The bearing housing carries a toothed arc, to which the prime mover is connected, e.g., by means of the rack. Energization of the prime mover will cause the gripping rings to rotate in opposite directions so that the tube will be connected to the gripping head. The gripping movement will be terminated as soon as the gripping jaws are in tight engagement. The rotating tube will then drive the gripping rings in the same sense. The coaxial gear wheels of the gear rotate in mutually opposite directions but these opposite movements are compensated by the planet wheel without interfering with the gripping movement. As the frictional connection between the gripping jaws and tube is established the cut-off carriage is started. This carriage is driven until the grip is released.

The tube can be gripped with jaws; at least two mutually opposite ones are required. For tubes having a large diameter, a multiplicity of jaws will be used to avoid a deformation of the tube by the gripping forces. It may be suitable to give the jaws an arcuate shape in order to reduce the pressure per unit of area. According to another feature of the invention it is more advantageous to use gripping belts. This enables the application of large gripping forces whereas only a relatively small pressure per unit of area is involved. Irregularities in the shape or surface finish of the tube will be compensated by the elastic gripping belts.

The tube length to be cut off must be gripped until the cut has been completed. According to the invention this is effected by a second gripping head. Both gripping heads are coupled together; in this case a common prime mover is sufficient.

The cut can be initiated when the cut-off carriage has been coupled to the tube. The milling unit is carried by a movable carrier, which is set to the depth of cut by a prime mover which is independent of the gripping operation. The milling unit is suitably mounted on a swing support, which ensures minimum frictional resistance in conjunction with highest rigidity. In the case of exactly circular tubes it is sufficient to set the milling device by causing it to engage a fixed stop. On the other hand, non-circular tubes require a setting which permits of a certain movement. According to the invention the setting operation causes a feeler secured to the milling unit to engage the outside or inside surface of the tube and to follow the surface of the tube so that the width of the bevel remains always equal relative to the selected reference surface. The yieldable setting is effected, e.g., by a power-actuated piston, which is supplied with pressure by a fluid fed from a reservoir. An embodiment of the feeler construction will be described hereinbelow with reference to FIGS. 10 and 11.

In the method in which feeler control is employed, two forces lying substantially in a normal plane are caused to act on the tube: The cutting force and, additionally, the feeler pressure. In the case of tubes having a small wall thickness it may be necessary to take up the transverse forces by a swing support lying opposite to the swing holder and also capable to move freely under pressure.

The structure described thus far is apparent from FIGS. 5–9. A wheeled base support 12 is movable on a bed 10 and carries two gripping heads 13 and between them the milling unit 15, which is rotatable about the pivot 17 and secured to the swing support 16. The milling unit comprises the inserted-tooth milling cutter 19 driven by motor 15.1 through a belt or chain drive 15.2 of conventional design. The gripping drives of both gripping heads 13 are connected by a shaft 14, which is acted upon by the gripping cylinder 20.

Figures 7, 8:
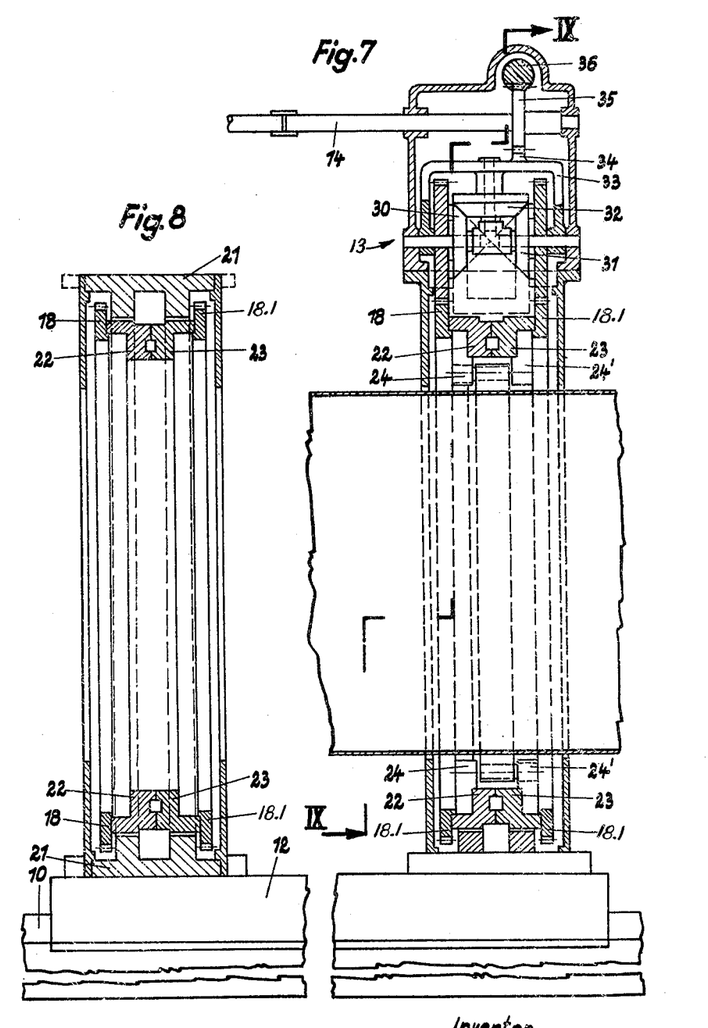
FIG. 7 is a sectional view showing a gripping head.
FIG. 8 shows only the housing and FIG. 9 is an end view showing the gripping head.
Figure 9:
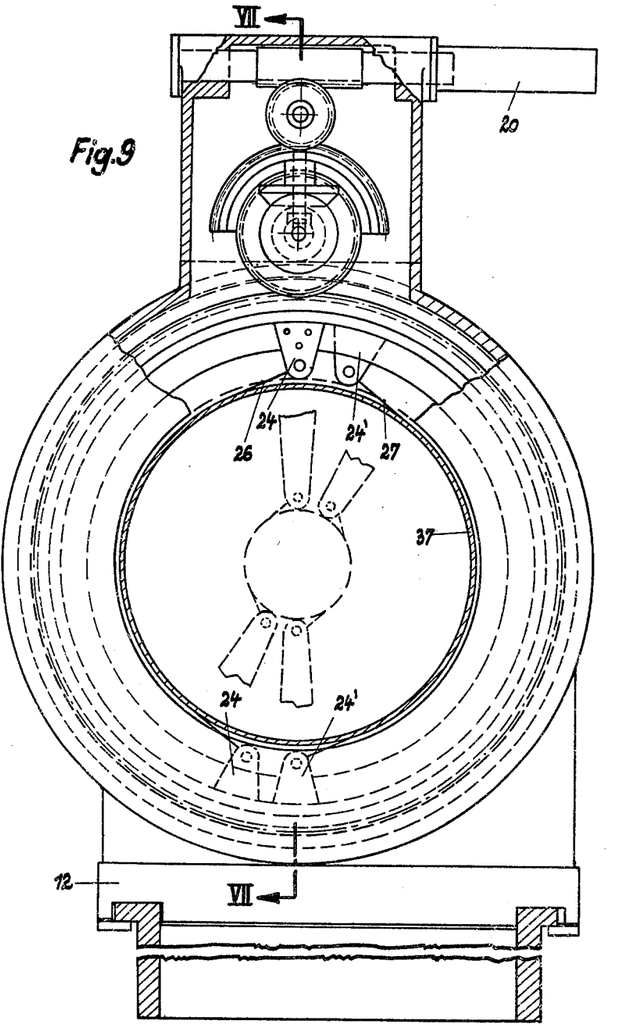

It is apparent from FIGS. 7 and 8 that the gripping rings 22 and 23 of the gripping heads 13 are mounted in the housing 21 for mutually independent rotation. Each gripping ring 22, 23 carries two replaceable straps 24, 24' with pins, on each of which a gripping belt 26, 27 is hung. The gripping rings 22, 23 carry gear wheels 18, 18.1, which are driven by the coaxial drive wheels 30, 31 of the epicyclic gear, one toothed ring being directly driven, the other by means of an idler not apparent in the drawing. The drive wheels 30, 31 are coupled by means of the planet wheel 32, which is mounted in the planet housing 33. The latter carries on the outside a toothed arc 34, which can be rotated by the piston 20 by means of racks 36 and the pinion 35.

If the cut-off carriage is to be coupled to the tube 37, pressure is supplied to the hydraulic cylinder 20, the piston of which will then rotate the two gripping rings 22, 23 in mutually opposite senses until the gripping belts 26, 27 are applied to the tube 37 (not shown in FIGS. 5, 7 and 8) under the selected pressure. As the frictional connection is established, the cut-off carriage is started. At the same time, the gripping rings 22, 23 begins to move in the same sense since they are carried along by the rotating tube. For this reason the gripping rings can rotate without affecting the gripping of the tube as the movement is compensated by means of the planet wheel 32.

Figure 5:
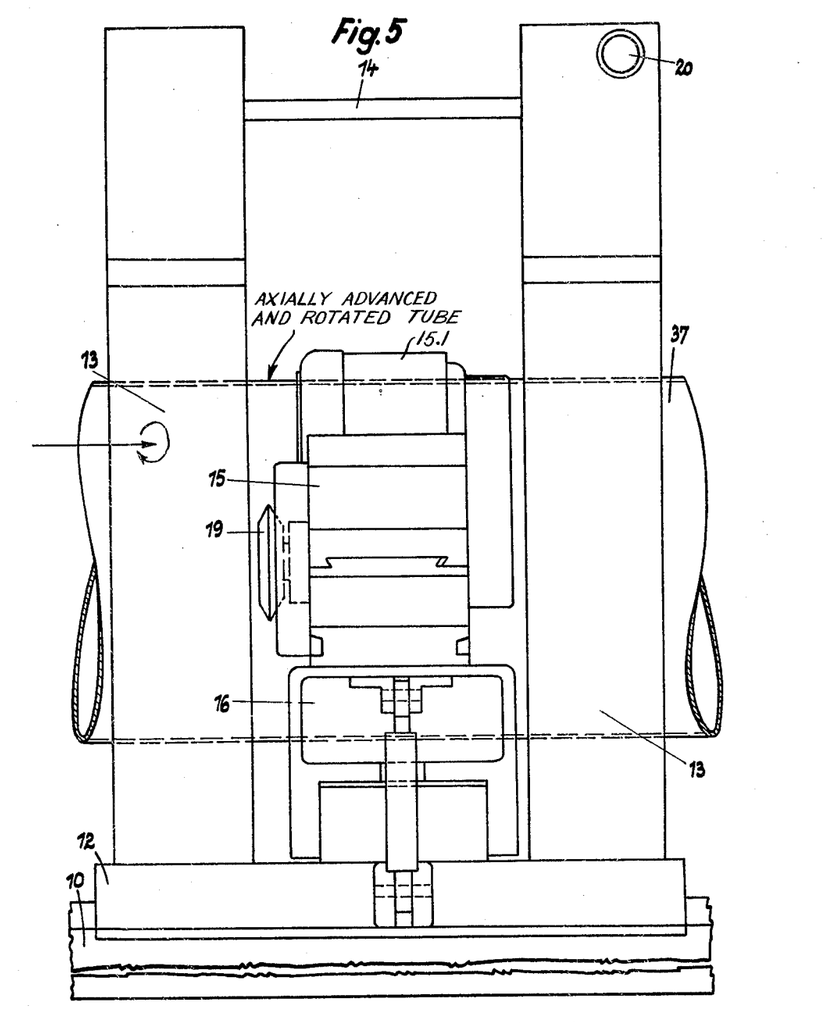
FIG. 5 is a side elevation showing the machine.
Figure 6:
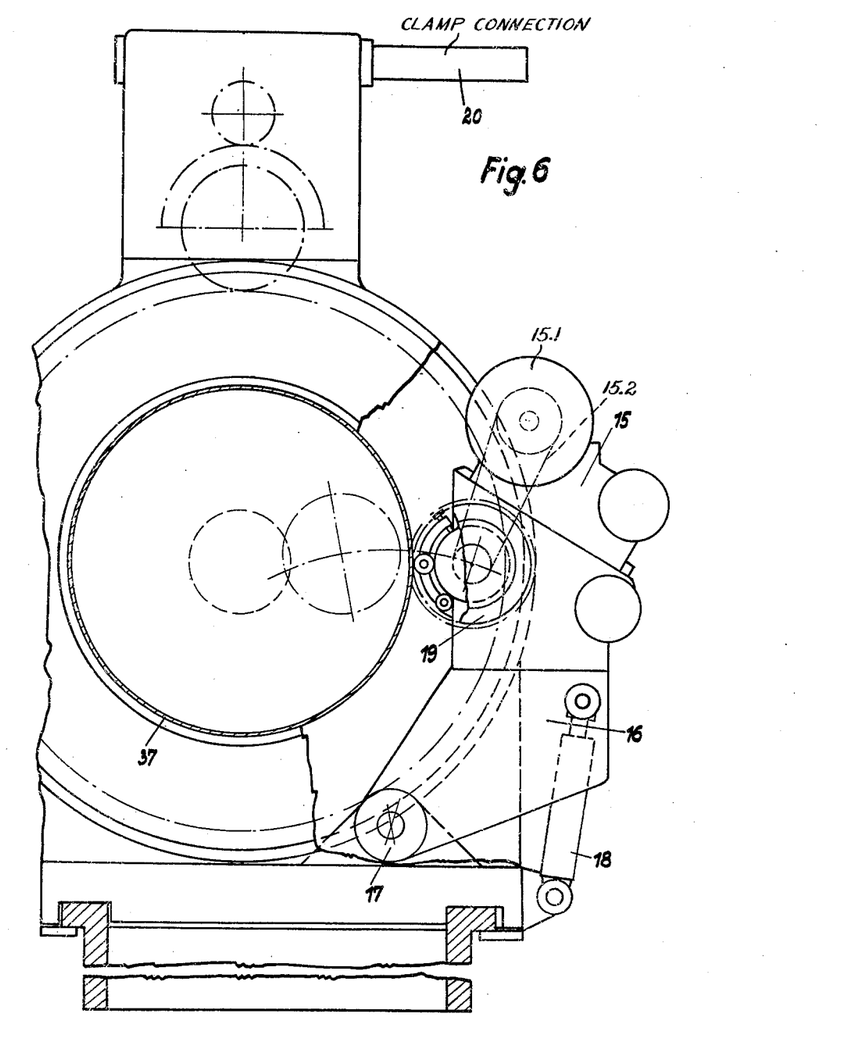
FIG. 6 is an end view.

The milling unit 15, which may be constantly energized, is now set by the hydraulic piston 18 to the adjusted depth of cut. The inserted-tooth cutter 19 penetrates and cuts through the tube wall. The cut is completed after somewhat more than one revolution of the tube. The length of tube which has been cut off is still firmly gripped just as the incoming tube. When the milling unit has been returned to its position of rest, the grip is released and the tube length which has been cut off is carried further. It has the desired profile on both end faces.

As soon as the coupling between the tube and the gripping heads is released, the cut-off carriage is moved to its initial position. For this purpose a propulsion drive of known type is provided.

Figure 10:
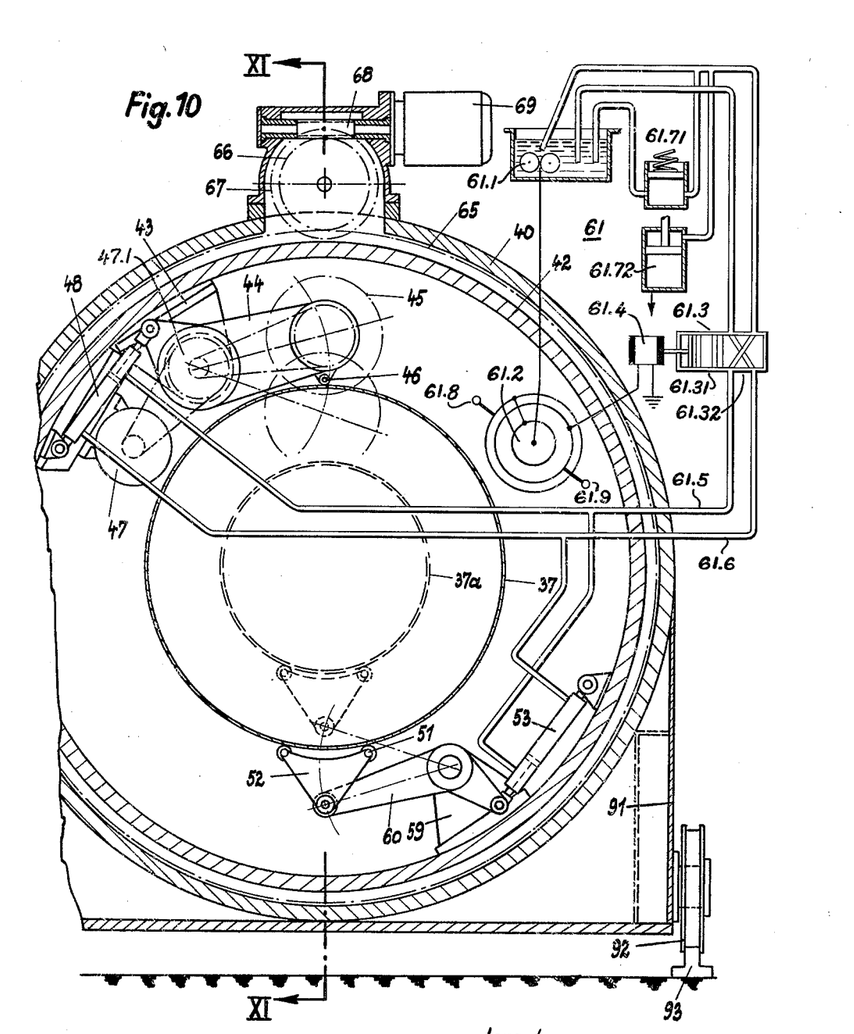
FIG. 10 shows this cut-off milling machine for tubes with a milling unit in a distributed arrangement and hydraulic setting, in an end view.
Figure 11:
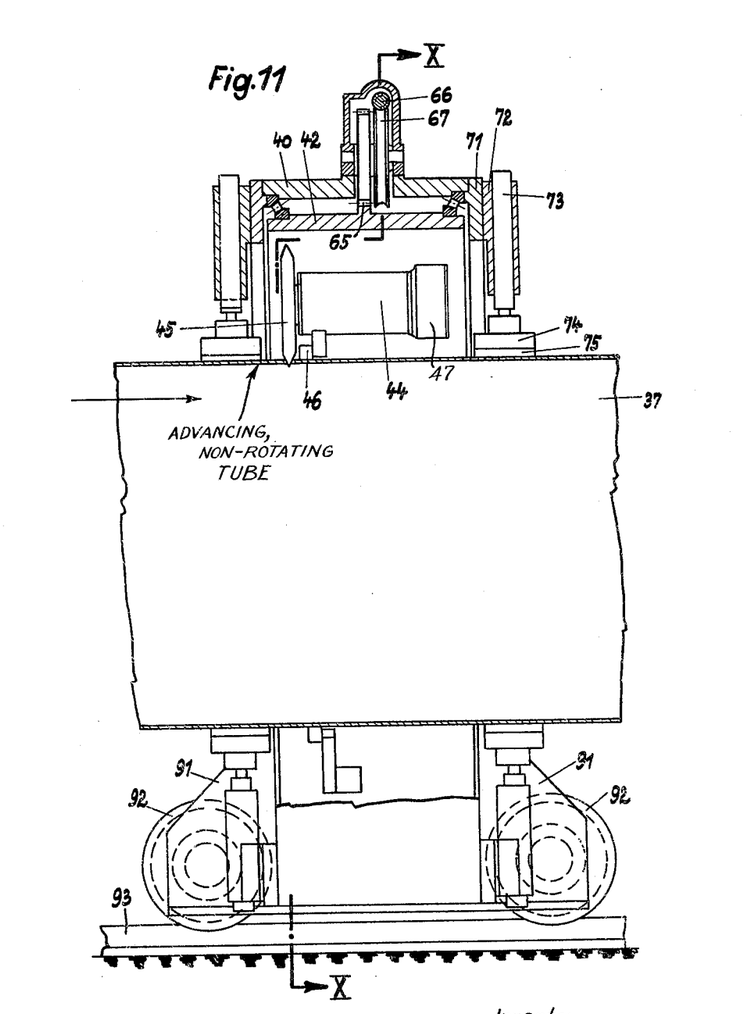
FIG. 11 is a longitudinal sectional view of this machine and FIGS. 12 and 13 are detail views showing gripping and receiving means of the machine.

Whereas FIGS. 5–9 show a tube cutting machine for rotating tubes, FIGS. 10–11 show a tube cutting machine arranged to cut off tubes which are moved only according to a straight line.

A method of producing tubes comprises rolling up elongated sheet metal panels and longitudinally welding the side faces opposing each other after rolling. Thus, tubes of this kind are individually processed. However, the requirements are similar to those of helical tubes. The tubes must be cut to any desired lengths; the end faces must be plane and normal to the longitudinal axis and must have a bevel for welding when desired. So-called parting-off lathes have previously been used for shaping the end faces. The tube is firmly gripped and faced and provided with a bevel at the end. Such parting-off lathes are substantially head-type lathes; they do not have a hollow spindle formed with a bore of sufficient size for the passage of a tube having a large diameter. They have previously been used only for machining the end faces but cannot be used for cutting at any desired point. It was previously necessary to remove large overlengths by torch cutting and facing the remaining tube lengths at the ends on parting-off machines. This required two separate operations, a double expenditure of time, more space and a higher machinery expenditure.

The machine which will be described hereinafter is arranged to grip the tube in a hollow receiver whereas the milling unit moves in a circle around the tube and cuts the same and, if desired, bevels the parting faces. The entire unit follows the axial movement of the tube, which is discharged from the tube forming machine.

The savings in time which can be achieved with this method are very large. In any continuously operating plant, the several stations must be matched. In the manufacture of longitudinally welded tubes the pace is set by the large machines. When the rate cannot be reached in one of the subsequent stations, it will be necessary to set up branch lines.

According to the invention, the tube to be processed is received on firm supports and gripped there. The cut-off milling machine which is in position of rest outside the delivery range is moved on wheels rolling on a bed toward the tube until it has reached the desired point, depending on the operation to be performed (cutting off, bevelling, or cutting-off and bevelling). At this point the cut-off milling machine is firmly connected to the tube by gripping jaws and is thus indirectly connected to the foundation. It may be suitable to clamp the cut-off milling machine itself directly to the bed. After the cut has been terminated, the cut-off milling machine travels back to its initial position and the machined tube can be discharged.

Two symmetrically arranged cut-off milling machines may be used to finish both ends of the tube at the same time.

The arrangement of a milling unit on or in a drum requires a particularly vibration-free design in order to ensure a steady cut. A compact design is also required to avoid an excessive diameter of the rotating drum. According to a further feature of the invention it is particularly advantageous to provide a distributed milling unit. A milling arm is pivoted to a bearing bracket firmly connected to the drum. By a hydraulic cylinder, the milling arm is either set to a fixed depth or is power-urged against the tube by means of feeler rollers. The bearing bracket serves at the same time as a support for a countershaft. The drive motor is disposed beside this shaft directly on the body of the drum. This distributed arrangement nestles closely to the cylindrical shape of the rotating body so that it is very economical regarding space.

The setting of the milling bracket to fixed depth is only permissible when the tubes to be machined are exactly circular. This cannot always be achieved for reasons involved in the manufacturing process. As it is required, on the other hand, that the bevel to be formed or the remaining normal are of equal width throughout their periphery and variations in the gauge of the plate must be expected, it is advisable to power-urge the pivoted arm carrying the milling cutter against the tube by means of suitable feelers. The simplest solution is feeling on the outside; in this case a feeler roller rolls on the outside periphery of the tube. The feeler may also roll on the inside periphery, if desired.

In the practical construction of a machine of this kind it has proved desirable to couple the tube also firmly to the cut-off milling machine. For this purpose the housing of each cut-off milling machine is provided with gripping heads, which connect the tube to the bearing housing before the cut begins. To locate the tube in axial position, one of the gripping shells is set to a fixed radial distance. The other shells can move freely while maintaining the pressure. With this device the tube is firmly connected both to the cut-off milling machine and to the foundation. The large masses provided by the design ensure a steady cut.

Where the cut-off milling machine is used only for bevelling the end faces, the described gripping means will be sufficient. When short overlengths are to be cut off, as is frequently the case where the ends are irregularly shaped, it is desirable to grip also these overlengths. For this purpose, additional gripping jaws are provided also on the bearing housing of the cut-off milling machine and are disposed towards the ends of the bed. If these jaws are provided according to the invention with laterally disposed gripping shells, the great advantage will be obtained that the short overlength cut off can be directly discharged downwardly when the gripping jaws have been opened.

Larger overlengths are additionally gripped in wheeled gripping heads, which are disposed outside the cut-off milling machines and toward the ends of the bed.

The gripping shells of these wheeled gripping heads are suitably arranged above and below the tube so that the tube end which has been cut off can be rearwardly discharged. The ejectors provided on the wheeled gripping heads facilitate the discharge.

A cut-off milling machine of the described design for tubes must be suitable for various tube diameters. It must be borne in mind that the approach plane is on a fixed level, as a rule. For this reason the tubes must be set to the correct axial position in the machine. According to the invention this is effected by means of roller stands, which are affixed to the base of the cut-off milling machine. The roller stands are vertically adjustable by a remotely controlled prime mover. The roller stands comprise rollers inclined against the horizontal axis in V-shape and serve to receive the incoming tube. In position of rest the roller stands are on that level which corresponds to the approach path. When the incoming tube has come to rest on the rollers arranged in V-shape, it is moved to the correct axial position by the remotely controlled prime mover. Only thereafter will the gripping heads be operated, whether they are of fixed or stationary type. According to an additional feature of the invention the roller stands may constitute ejectors effecting the discharge of the tube in the outgoing direction.

The machine shown in FIGS. 10–11 has the following design:

The drum 42 is mounted in the housing 40 and accommodates in its interior, e.g., a milling unit of the following type: The milling arm 44 carrying the inserted-tooth cutter 45 is pivoted in a bearing bracket 43, in which a countershaft is also mounted. The drive motor 47 is separately affixed. This motor, by means of vibration damping machine elements of any desirable type, drives the countershaft 47.1 of the bearing bracket 43. The milling arm 44 is set to the depth of cut by means of the hydraulic cylinder 48. The milling arm 44 is provided with the feeler roller 46, which engages the tube 37 to be machined. In accordance therewith the cutter head 45 follows the outside periphery of the tube 37 and the bevel will always have the same width with respect to the outside periphery of the tube.

Opposite the inserted-tooth cutter 45, a countersupport 52 is disposed, which carries compensating rollers 51. This countersupport is pivoted to an arm 60 which is freely movable in the bearing bracket 59. Just as the milling arm 44, the countersupport 60 is also set with the aid of a hydraulic cylinder 53.

The setting cylinders 48 and 53 are controlled by a hydraulic unit schematically indicated at 61, by means of a slide valve 61.3 remotely controlled by solenoid or motor means 61.4. The hydraulic unit 61 contains essentially a pump 61.1 with electric drive motor 61.2, pressure limiting means 61.71, control unit valves 61.31 and 61.32 and, if required a reservoir 61.72. The hydraulic unit is self-contained and connected by appropriate conduit means 61.5, 61.6, to the setting cylinders 48, 53. It operates independently of its position so that it can follow the rotation of the drum 42. The energizing and control currents are fed by means of slip rings 61.8, 61.9.

At its apex, the housing 40 carries a worm gearing, which drives by means of a gear wheel 66 the large gear wheel 65 secured to the drum 42. The worm wheel 67 is rotated by the electric motor 69 by means of a worm 68.

The housing 40 of the milling machine for cutting tubes is downwardly extended. The axles for the drive wheels 92 are mounted in the feet 91 so that the milling machine for cutting tubes can be moved on the rails 93.

The shell of the housing 40 is laterally covered by strong bearing plates 71, which carry the gripping heads 72. The latter accommodate hydraulic cylinders 73, which can be radially advanced according to the respective tube diameter. Base shells 74 are carried by the piston of the hydraulic cylinder at its head and have gripping shells 75 screwed thereto, which are selected to match the tube diameter. One pair of such gripping jaws 73, 74, 75 having vertical axes are disposed on either side of the cut-off milling machine. This arrangement shown in FIG. 11 constitutes the simplest gripping device.

The cut-off milling machine is axially moved over the tube 37 until the inserted-tooth cutter 45 has reached the desired plane of cut. It would also be possible to secure the cut-off milling machine to the bed and to introduce the tubes axially. In both cases, however, the tube is firmly connected to the cut-off milling machine and consequently to the foundation immediately before the cut. The gripping shells 75 are operated to couple the tube to the housing 41. The lower gripping shells are set for firm engagement to locate the tube.

The upper gripping shells can move freely under pressure. When the tube has been gripped, the milling unit is started and the inserted-tooth cutter 45 begins to rotate. When the working speed has been reached, the hydraulic cylinder 48 is energized to set the milling arm 44 so that the feeler roller 46 engages the outside surface of the tube 37. At the same time the hydraulic cylinder 53 of the countersupport arm 60 has been energized so that the arcuate portion of the countersupport 52 engages also the outside periphery of the tube. The positions for the largest and smallest tube diameter 37 and 37a are shown in FIG. 10.

During the setting operation the inserted-tooth cutter 45 cuts into the tube. Now the motor 69 is started and the drum 42 beings to rotate. The cut has been completed after approximately one rotation. The milling arm 44 is then returned to its position of rest, the drive motor 47 is deenergized and the inserted-tooth cutter 45 comes to a standstill. The gripping heads 73, 74, 75 on the right are relieved and the cut-off milling machine can be returned to its initial position. It carries the cut-off tube end along because the gripping heads on the left are still closed. When the cut-off milling machine has reached its initial position, there is space for discharging the tube transversely to its axis. The cut-off tube end may be, e.g., axially discharged.

This embodiment of the cut-off milling machine for tubes may be used for cutting off and bevelling for a Y-joint, for cutting off alone and for bevelling alone.

Figure 12:
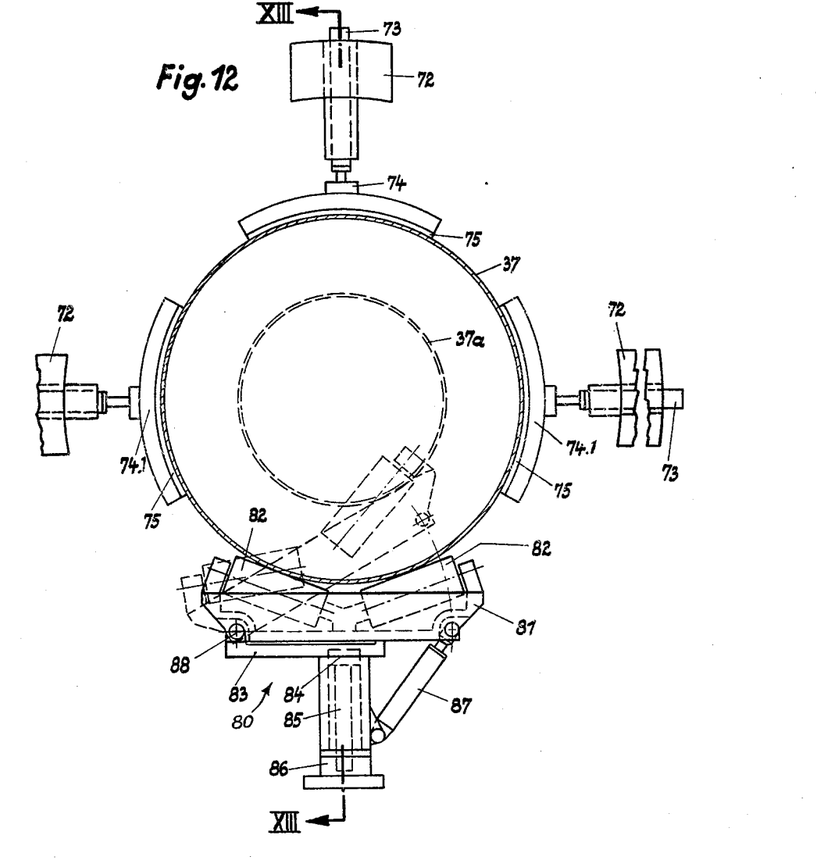
Figure 13:
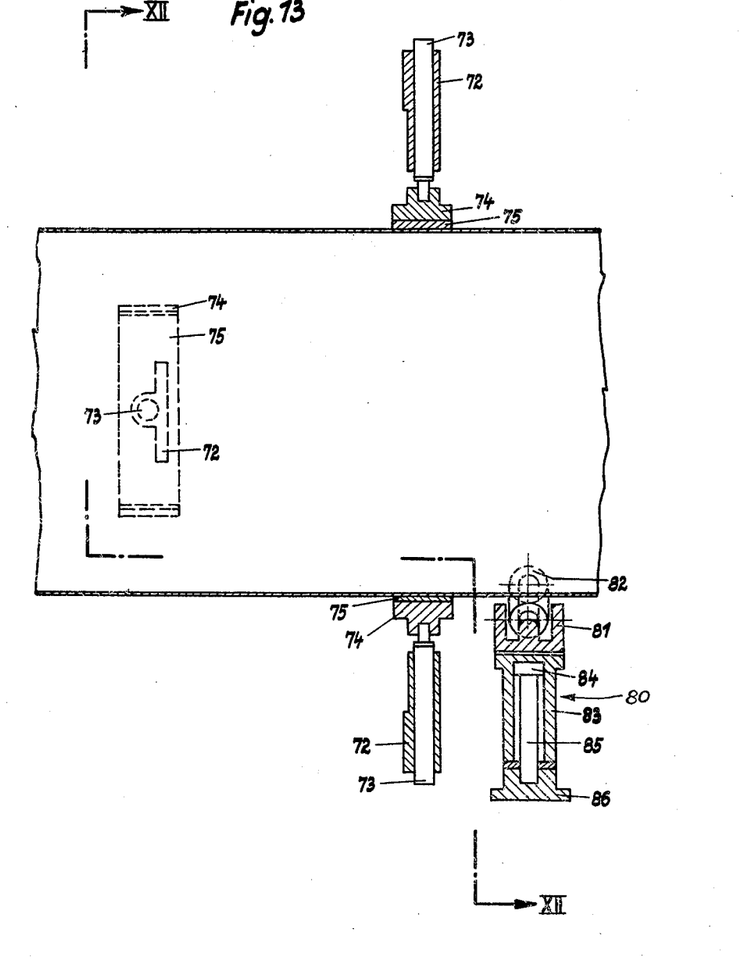

FIGS. 12 and 13 are detail views of gripping and ejecting means. As has been described, the tube is firmly connected to the bearing housing by gripping jaws 72, hydraulic cylinders 73, base shells 74 and gripping shells 75. Gripping jaws having a vertical axis are disposed toward the middle of the length of the tube. Outside the cut-off milling machines, gripping shells having a horizontal axis are apparent as an alternative, see FIG. 12. They afford the advantage that short overlengths can be directly downwardly discharged after the gripping shells have been opend. It has proved advantageous to provide the complete machine with a hollow bed and to utilize the space thus provided for discharging the overlengths and of the chips obtained.

Roller stands 80 (only one shown in FIG. 12) receive the oncoming tube. Two rollers 82 are inclined towards each other in V-shape. They are mounted in a roller housing 81 and can be lifted and lowered with the aid of the hydraulically operated piston 84 and of the piston rod 85. This enables an adaptation to various tube diameters. In the position of rest of the roller stands the rollers are close to the approach path, which does not belong to the invention. When the oncoming tube has come to rest on the rollers 82, it is moved to the correct axial position by means of the hydraulic piston 84. The cut-off milling machine can now be moved over the tube, which rotates on the rollers 82, but remains linearly stationary. When the cut has been completed, the gripping jaws 72 are opened first. Since the inner gripping jaws 72 disposed toward the center of the length of the tube have a vertical axis, they open a path in a lateral direction when they have been opened. The roller housing is tilted about the axis 88 by means of the hydraulic cylinder 87. This causes the rollers to lift the tube and to eject it rearwardly, opposite to the oncoming direction. In this case too the roller stands can move the cut tube to the level of the roll-off path by means of the hydraulic piston 84.

The roller stands 80 are mounted on the base of the cut-off milling machine and follow the longitudinal movement thereof.

I claim:
1. A milling cutter of the double cone type, including:
   two separate series of double edged teeth alternately staggered to a degree such that
   the teeth of one series of alternate teeth cut with one edge a first face of one cut-off profile and with the other edge a second face of the other profile and that
   the teeth of the second series cut with one edge a first face of the other profile and with the other edge a second face of the one profile,
   said first face being inclined to at least one of said second faces together to form two complete cut-off profiles at least one of which has a chamfer,
   whereby a minimal teeth spacing and consequent large feed rate can be used, and Y-shaped end faces of the cut can be directly obtained.

2. Apparatus according to claim 1, wherein said cutter teeth have inserted hard metal cutting plates.

3. Apparatus for cutting off axially moving tubular workpieces comprising:
   rail means adapted for ground mounting parallel to the longitudinal axis of a workpiece,
   carriage means adapted to move on said rail means, surrounding the tubular workpiece, and carrying a cutter and a cutter driving means,
   means for clamping said carriage means to said workpiece such as to follow said axially advancing movement of the workpiece, said clamping means including
   two clamping rings rotatably supported thereon and having clamping jaws; and
   planetary drive means for rotating said clamping rings in opposite directions,
   whereby said cutter and cutter driving means can be brought into engagement with the workpiece without receiving support therefrom.

4. Apparatus according to claim 3, futher comprising:
   a second clamping means also having two clamping rings,
   means for drivingly coupling said four clamping rings, and
   means for actuating the coupled clamping rings from a single source of energy.

5. Apparatus according to claim 3, further comprising at least two clamping levers with clamping jaws at their ends, the pivots of said levers being linked to alternate clamping rings and the levers swinging upon counterrotation of the rings towards the tubular workpiece in the clamping direction, contacting the clamping jaws with the workpiece.

6. Apparatus according to claim 3, further comprising two clamping strips whose ends are alternately linked to the two clamping rings, respectively, said strips snugly but equalizingly contacting said tubular workpiece in clamping direction upon counterrotation of the clamping rings.

7. Apparatus according to claim 3 wherein the cutter is a milling cutter of the double cone type, including:
   two separate series of double edged teeth alternately staggered to a degree such that
   the teeth of one series of alternate teeth cut with one edge a first face of one cut-off profile and with other edge a second face of the other profile and that
   the teeth of the second series cut with one edge a first face of the other profile and with the other edge a second face of the one profile,
   said first faces being inclined to at least one of said second faces together to form two complete cut-off profiles at least one of which has a chamfer,
   whereby a minimal teeth spacing and consequent large feed rate can be used, and Y-shaped end faces of the cut can be directly obtained.

References Cited by the Examiner

UNITED STATES PATENTS

| | | | |
|---|---|---|---|
| 2,200,544 | 5/40 | Drummond | 90—11 |
| 2,209,483 | 7/40 | Stubbs | 90—11 |
| 2,561,484 | 7/51 | Shaw et al. | 90—12 |
| 2,842,238 | 7/58 | Shaw et al. | 90—12 |
| 3,051,061 | 8/62 | Baxter et al. | 82—53.1 |

FOREIGN PATENTS 506,467   10/54   Canada.

WILLIAM W. DYER, Jr., *Primary Examiner.*